Patented Apr. 27, 1948

2,440,378

UNITED STATES PATENT OFFICE 2,440,378

TREATMENT OF SODIUM ALUMINATE SOLUTIONS

James W. Newsome, Belleville, Harold W. Heiser, East St. Louis, and James R. Wall, Collinsville, Ill., assignors to Aluminum Company of America, Pittsburgh, Pa., a corporation of Pennsylvania No Drawing. Application September 13, 1946, Serial No. 696,936

2 Claims. (Cl. 23—52)

In the recovery of alumina from aluminous ores, such as bauxite, by the well-known Bayer process in which the ore is digested under pressure with caustic soda solution, the sodium aluminate solution produced contains a small percentage of dissolved complex sodium organic compounds as a result of the presence of organic matter, such as humus, in the ore. The solution also normally contains sodium carbonate in view of the use of that compound in producing the caustic soda solution mentioned above by reaction of lime with excess sodium carbonate.

It is sometimes desirable to concentrate such sodium aluminate solutions by evaporation of water therefrom. However, upon concentrating the solution sufficiently, a gelatinous, slimy precipitate of sodium organic salts is produced which is objectionable in many instances.

For example, in the operation of the processes described in U. S. Patents 2,375,342 and 2,375,343, in which there is added to a Bayer process solution a sodium aluminate solution produced by sintering aluminous material with soda ash and limestone, and leaching the sintered material, the latter solution frequently contains dissolved sodium sulfate resulting from the conversion of sulfides in the aluminous material to sodium sulfate in the sintering operation, or from the formation of sodium sulfate in carrying out the sintering process by passing hot sulfur-bearing gas, produced by combustion of coal, through or over the material being sintered. If the process is operated cyclically by repeatedly precipitating aluminum hydroxide from the mixed sodium aluminate solutions, and then using the "spent liquor" in the leaching of additional sintered material, or in the digestion of additional bauxite, or both, the sodium sulfate content of the circulating liquid soon becomes undesirably high for proper operation of the system.

If sodium fluoride is present in the solution, it is possible to precipitate sodium sulfate from the solution in the form of schairerite ($Na_2SO_4 \cdot NaF$) by evaporating sufficient water from the solution. However, if during such evaporation the above-mentioned gelatinous precipitate of sodium organic salts is also produced, that precipitate interferes seriously with the settling or filtration of the precipitated schairerite from the solution. It is the object of this invention to provide a method of preventing or inhibiting the formation of the gelatinous precipitate mentioned.

We have discovered that the precipitation of gelatinous sodium organic salts during the concentrating of a sodium aluminate solution, produced by digesting with a caustic soda solution an aluminous ore containing organic material, can be inhibited by adding to the solution a small amount of rosin, rosin oil, or tall oil. Thus, by using that procedure it becomes possible to concentrate the solution sufficiently for precipitation of schairerite from the solution, without precipitation of sodium organic salts from the solution to interfere with the separation of the schairerite from the solution by settling or filtration.

Of the inhibitors mentioned, tall oil is preferred because of its high degree of effectiveness and its cheapness. As is well known, tall oil is composed chiefly of fatty acids and resin acids, and is a by-product of the manufacture of paper pulp from resinous wood. A partially-hydrogenated form of rosin sold by Hercules Powder Company under the name "Staybelite Resin," and a tall oil derivative sold by Armour and Company under the name T A D–1181.5–C act similarly to rosin and tall oil respectively in carrying out this invention, and are considered herein as being forms of rosin and tall oil.

The inhibitor can be added to the solution prior to the evaporation procedure, or it can be added during evaporation if evaporation has not proceeded sufficiently to precipitate too much sodium organic salt. In general, the larger the concentration of dissolved sodium organic salts present, the larger the amount of inhibitor needed. However, the amount of inhibitor needed in any case is very small compared with the amount of solution treated. For example, excellent results have been obtained with 20 parts by volume of the inhibitor per million parts of a solution containing 84 grams per liter of sodium aluminate, 100 grams per liter of sodium carbonate, 39 grams per liter of sodium sulfate, and 4.8 grams per liter of sodium fluoride when precipitating schairerite from the solution by evaporating 325 grams per liter of water from the solution, although the solution contained enough sodium organic salts that without the addition of the inhibitor to the solution a gelatinous precipitate of such organic salts formed in sufficient amount prior to completion of the evaporation that efficient settling and filtering of the schairerite from the solution was virtually impossible.

In addition to the above-mentioned advantages, it has been noted that when schairerite is precipitated in the presence of the above-mentioned gelatinous sodium organic salts, it is in the form of flat, plate-like crystals. That form of crystal is not particularly well adapted for settling readily, and the crystals likewise tend to plug the pores in filter cloth during filtration of the solution. On the other hand, when the precipitation of organic salts is prevented in accordance with this invention, the schairerite precipitates as spherical aggregates which are adapted to settle readily and also are large enough to have much less tendency to plug the filter cloth than the flat crystals mentioned previously.

We claim:

1. The method of inhibiting precipitation of sodium organic salts from an aqueous sodium aluminate solution produced by digesting alumina-bearing ore containing organic material with caustic soda solution, during concentrating of said sodium aluminate solution by evaporation of water therefrom, which comprises adding to the solution to be concentrated at least one material from the group consisting of rosin, rosin oil, and tall oil.

2. In the process comprising removing dissolved sodium sulfate present in an aqueous sodium aluminate solution containing dissolved sodium organic salts, and produced by digesting alumina-bearing ore containing organic material with caustic soda solution, by evaporating water from the solution sufficiently to precipitate sodium sulfate values therefrom, the step comprising introducing into the solution to be concentrated a material selected from the class consisting of rosin, rosin oil, and tall oil.

JAMES W. NEWSOME.
HAROLD W. HEISER.
JAMES R. WALL.